United States Patent

Gilbert

[15] 3,635,075
[45] Jan. 18, 1972

[54] OSMOMETER

[72] Inventor: Paul T. Gilbert, Los Altos Hills, Calif.
[73] Assignee: Beckman Instruments, Inc.
[22] Filed: June 29, 1970
[21] Appl. No.: 50,460

[52] U.S. Cl. ...........................................................73/64.3
[51] Int. Cl. .......................................................G01n 11/00
[58] Field of Search ...............................73/64.3, 398, 401

[56] References Cited

UNITED STATES PATENTS 3,195,346  7/1965  Ehrmantraut et al. ....................73/64.3

Primary Examiner—Donald O. Woodiel
Attorney—William F. McDonald and Robert J. Steinmeyer

[57] ABSTRACT

An osmometer of the type having an osmotic membrane rigidly fitted to a cell having an inner space filled with a reference solvent is disclosed. The outer surface of the membrane is adapted to be in contact with the liquid solution whose osmotic pressure is to be measured. The inner surface of the membrane is in contact with the solvent. A pressure transducer membrane having two sides is positioned with one side in contact with the solvent so as to respond to the osmotic pressure developed across the osmotic membrane. Means are provided for transmitting to each side of the transducer membrane any change of mechanical and hydraulic pressure that may occur at the osmotic membrane whereby the transducer membrane responds only to the osmotic pressure. In one embodiment means are also provided for balancing the osmotic pressure with a hydraulic pressure.

11 Claims, 5 Drawing Figures

PATENTED JAN 18 1972

INVENTOR.
PAUL T. GILBERT
BY
William F. McDonald
ATTORNEY

INVENTOR.
PAUL T. GILBERT
BY William F. McDonald
ATTORNEY

OSMOMETER

BACKGROUND OF THE INVENTION

The instant invention relates to devices for measuring the osmotic pressure of a solution.

A particularly effective type of osmometer is that known as the Hansen osmometer and described by A. T. Hansen in *Acta Physiol. Scand.* 53, 197 (1961). The Hansen osmometer requires a cell having an inner space of small volume filled with a reference solvent. A circular osmotic membrane of relatively large area is tightly held, clamped around its edge, against the smooth, slightly convex surface of the cell body. The membrane is exposed to direct contact with the inner space only over a very small central area. The rest of the inner surface of the membrane is in hydraulic contact with the inner space only indirectly through the thin film of solvent trapped between the membrane and the solid supporting surface of the cell body, but pressure is transmitted through this thin film with little impedance. The outer surface of the membrane is placed in contact with the liquid solution whose osmotic pressure is to be measured. The solvent in the inner space is confined by the osmotic membrane, the walls of the cell, and the diaphragm or membrane of a pressure transducer responsive to the pressure of the solvent. When the sample solution differs from the filling solvent in osmotic pressure, osmotic flow takes place through the osmotic membrane until the resulting change of pressure stops the flow. The pressure is transmitted through the thin film between the membrane and the cell body and through the inner space to the transducer membrane.

The Hansen osmometer is characterized by an extremely high elastance or stiffness of the system comprising the osmotic membrane, the solvent in the inner space, and the membrane of the pressure transducer. That is, a large pressure is required to cause a very small change in volume of this system. High elastance is imparted to the osmotic membrane by virtue of its being rigidly supported against the smooth solid surface of the cell except for the very small unsupported area in contact with the inner space. It therefore moves very little in response to a reduction of pressure in the inner space. The solvent has high elastance by virtue of the rigidity of the walls of the cell and the small volume of the solvent, minimizing the effect of its compressibility. The transducer membrane is given high elastance by proper choice of diameter, thickness, and elastic modulus. It is this combination of extremely high elastance of the system, usually of the order of 10 $\mu$b/pl (microbars per picoliter), and large area of the osmotic membrane, of the order of 1 cm.$^2$, that enables the osmotic pressure to attain equilibrium very quickly. Hansen achieved a time constant of 5 seconds, the fastest heretofore reported for a membrane osmometer.

An important disadvantage of the Hansen type osmometer, which is unrelated to the nature of the pressure transducer, is that the transducer measures the net or gauge pressure of the solvent within the cell, and this measurement includes the hydrostatic pressure, i.e., hydraulic or mechanical pressure exerted by the sample upon the membrane. Because of the quickness of response of the system, any change in this pressure causes a flow of the solvent through the membrane that rapidly balances it. The membrane transmits mechanical and hydraulic pressure freely. Thus, the measured osmotic pressure is afflicted with errors due to hydrostatic pressure if, for example, the depth of a flowing sample varies or if the depths of sample and a test blank are not equal.

When high sensitivity is wanted, it can be quite hard to control the hydrostatic pressure of a sample with the requisite precision. If the transducer measures absolute rather than gauge pressure, it also responds to changes of atmospheric pressure. Barometric fluctuations can spoil the precision in the micromolar range of concentration. If the transducer measures gauge pressure in the cell, it still detects inhomogeneities of atmospheric pressure in the small region between the surface of the sample and the side of the transducer element exposed to the atmosphere. Over a distance of a few centimeters, this inhomogeneity can cause fluctuations of approximately one microbar unless the instrument is carefully shielded from breezes. Such fluctuations can be minimized by having the transducer as close as possible to the sample.

Fluctuations of temperature, although less detrimental, can cause some problems. As the cell warms up, the filling solvent expands, creating pressure. The expansion also changes the density of the solvent and therefore slightly changes the hydrostatic head of the solvent inside the cell. The change of internal mechanical pressure generated by these thermal effects is promptly relieved by flow through the osmotic membrane in the same way as an external change of hydrostatic pressure or head. Such balancing of pressure due to changes of temperature or head takes place whether or not an osmotic pressure is being experienced. The mechanical or hydraulic pressure behaves independently of the osmotic pressure.

There is another difficulty resulting from the nature of certain types of high-elastance pressure transducers advantageously used in an osmometer of the Hansen type. Such pressure transducers have very small membranes whose motion is most conveniently observed and measured with an optical lever, i.e., a beam of light reflected from the surface of the membrane itself to a photosensitive detector. Transducers of this kind, especially those possessing the highest elastance (approaching 100 $\mu$b/pl) together with the highest sensitivity (approaching 0.1 $\mu$b), give a linear response, i.e., a signal proportional to the pressure, over only a limited range of pressure. Such transducers in which the membrane is liquid are also physically incapable of sustaining a large range of pressure. The concentration of a solution having an osmotic pressure corresponding to the greatest linear response of such a pressure transducer may be no more than 10 micromoles per liter, while the concentration corresponding to the greatest sustainable pressure may be of the order of 1 millimole per liter.

SUMMARY OF THE INVENTION

It is an object of the instant invention to provide an osmometer of the type described wherein changes of mechanical and hydraulic pressure are compensated so that their influence upon the osmotic pressure measured is eliminated. Advantageously, this is accomplished without adversely affecting the response time and sensitivity of the instrument.

It is another object of the invention to provide an osmometer wherein the osmotic pressure is balanced by an externally applied hydraulic pressure that can be measured. The burden of measurement is thereby removed from the pressure transducer, which serves only to indicate the point of balance. Limitations of linearity and sustainable pressure in the transducer are thereby also removed. It becomes possible to combine very high sensitivity with linearity over a substantially unlimited range of osmotic pressure.

The osmometer according to the instant invention has an osmotic membrane rigidly fitted to a cell which has an inner space filled with a reference solvent. The outer surface of the membrane is adapted to be in contact with the liquid solution whose osmotic pressure is to be measured. The inner surface of the membrane is in contact with the solvent. A pressure transducer membrane having two sides is positioned with one side in contact with the solvent so as to respond to the osmotic pressure developed across the osmotic membrane. Means are provided for transmitting to each side of the pressure transducer membrane any change of mechanical and hydraulic pressure that may occur at the osmotic membrane, whereby the transducer responds only to the osmotic pressure. In one embodiment means are also provided for balancing the osmotic pressure with a hydraulic pressure.

This description of the invention and the advantages thereof will become clearer from the following detailed description taken in conjunction with the accompanying drawings.

BRIEF DESCRIPTION OF THE DRAWINGS

Throughout the drawings, the same reference numerals have been applied to various corresponding parts.

DETAILED DESCRIPTION

Figure 1:
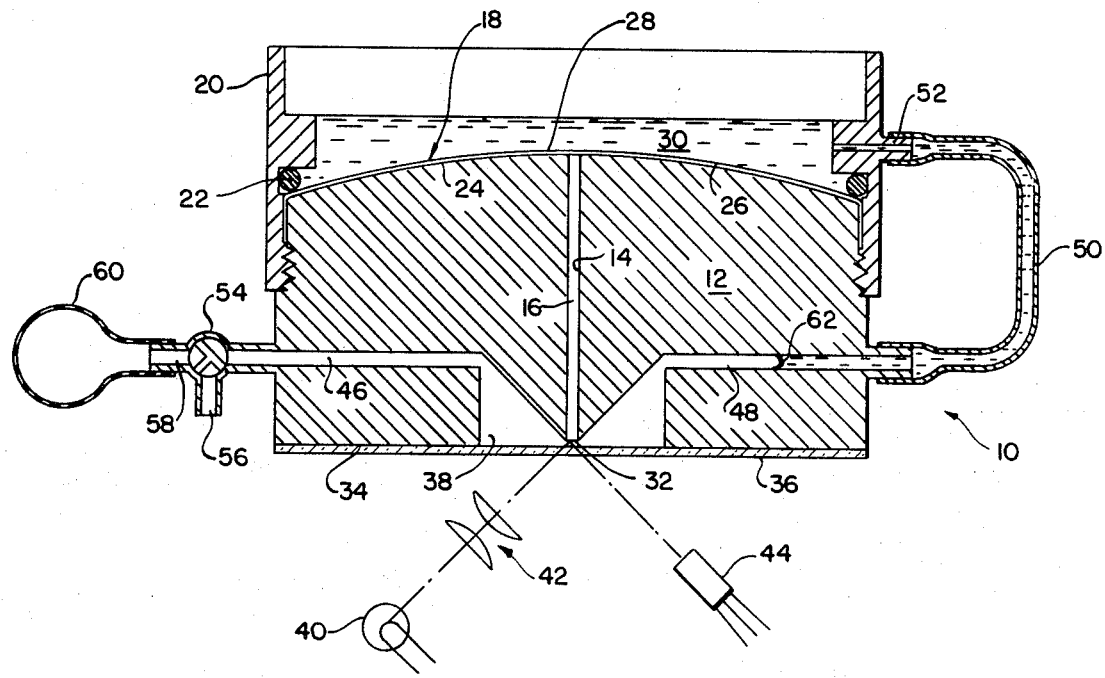
FIG. 1 is a front elevational view, in section, of one embodiment of the instant invention.

FIG. 1 shows an osmometer, indicated generally at 10, including a cell 12 having an inner space 14 filled with a reference solvent 16. A suitable osmotic membrane 18 is rigidly fitted to cell 12 as by cap 20 and O-ring 22. As shown, membrane 18 is disposed over the generally spherical surface 24 of cell 12 in such a way that solvent 16 is in contact with the entire inner surface 26 of the membrane. The other side 28 of osmotic membrane 18 is in contact with the liquid solution 30 whose osmotic pressure is to be measured. Solvent 16 is in contact with a pressure transducer membrane 32 which is shown sealed against space 14. This membrane may be either solid or liquid, but is shown as a liquid membrane of the type described in copending application Ser. No. 50,462 filed June 29, 1970. In this example, membrane 32 is simply the terminal meniscus of solvent 16 at the lower end of inner space 14. Inner space 14 desirably has a very small diameter, for example, about 0.1 millimeters, to impart a suitable elastance to transducer membrane 32. Lower face 34 of cell 12 is enclosed with a thin transparent window 36 of suitable material such as glass. Window 36 confines an air space 38 that is exposed only to transducer membrane 32, and, as will be shown hereinafter, to the sample solution 30. The motion of membrane 32 under the influence of pressure is observed and measured, in this example, by means of an optical lever. The optical lever includes a light source 40 arranged so as to illuminate transducer membrane 32. Transducer membrane 32 is deflected in response to the osmotic pressure in solution 30 either inwardly or outwardly. The arrangement is such that membrane 32 will reflect the light from light source 40 in a manner dependent upon the pressure being sensed to a sensor or detector circuit such as is described in detail in copending application Ser. No. 50,463 filed June 29, 1970. More specifically, the light from light source 40 which is focused upon membrane 32 by lens system 42 is reflected in accordance with the osmotic pressure sensed to a photodetector 44. If desired, window 36 may have an antireflection coating to cut down stray light in the optical lever system.

Inner space 38 is airtight except for two passages 46, and 48. Passage 48 includes a flexible hose 50 connected to a tube 52 that communicates through cap 20 with solution 30. Solution 30 is thus free to flow through tube 52, hose 50, and passage 48 toward space 38. Passage 46 is connected to a three-way stopcock 54, one of whose outlets 56 goes to the atmosphere, and the other outlet 58 to a rubber bulb 60. By manipulation of stopcock 54 and bulb 60, solution 30 can be drawn down into passage 48 until its meniscus 62 is in a portion of passage 48 which is substantially horizontally disposed. Passage 48 desirably is narrow enough that meniscus 62 will remain intact and solution 30 will not spill down into space 38. With the stopcock 54 closed, meniscus 62 will remain stationary or will move only slightly in response to changes of temperature in space 38 or to variations in the hydrostatic pressure in solution 30. These various pressures will be referred to as mechanical and hydraulic pressures. Any such motion will not alter the effective elevation of meniscus 62 since the portion of passage 48 in which it is contained is substantially horizontal. Alternatively, meniscus 62 could be confined to tube 52, which is also substantially horizontally disposed, with passage 48 and hose 50 being filled with air. The transducer membrane 32 is thus in hydraulic contact with the solution 30 through airspace 38. Any changes in hydrostatic pressure in the sample due to changes of depth or density and any changes in atmospheric pressure, acting on the sample, are transmitted through passages 52, 50, and 48 to the outer surface of transducer membrane 32, and simultaneously through osmotic membrane 18 and inner space 14 to the inner surface of transducer membrane 32. Such changes of hydrostatic or atmospheric pressure therefore have no effect upon membrane 32. Although the two sides of membrane 32 may not be subjected to the same hydraulic and mechanical pressure, any difference of such pressure across the membrane remains constant. The transducer membrane 32 thus responds only to the osmotic pressure developed across osmotic membrane 18 in consequence of differences of composition between the liquids on the two sides of membrane 18. The osmometer is thereby compensated for mechanical and hydraulic pressure.

If tube 52 is sufficiently small, the time constant of the compensating system will match that of the osmometer. Thus, any rapid change or fluctuation of mechanical and hydraulic pressure acts with equal speed through the osmotic membrane 18 and the compensating system comprising tube 52, hose 50, and passage 48, causing no momentary unbalance. Further, if the inner opening of tube 52 is small enough, the contents of the tube will scarcely mix with the sample solution 30. Samples can then be changed freely without trouble from contamination by the contents of tube 52. In other words, tube 52, hose 50, and passage 48 will not have to be flushed out every time samples are changed. It is desirable to leave the same liquid, suitably solvent 16, in tube 52, hose 50, and passage 48 (unless passage 48 and hose 50 are filled with air) so that the liquid in the compensating system always exerts the same mechanical and hydraulic head. Any difference of level between the inner opening of tube 52 and osmotic membrane 18 causes errors of negligible magnitude, due to differences of density between samples.

Figure 2:
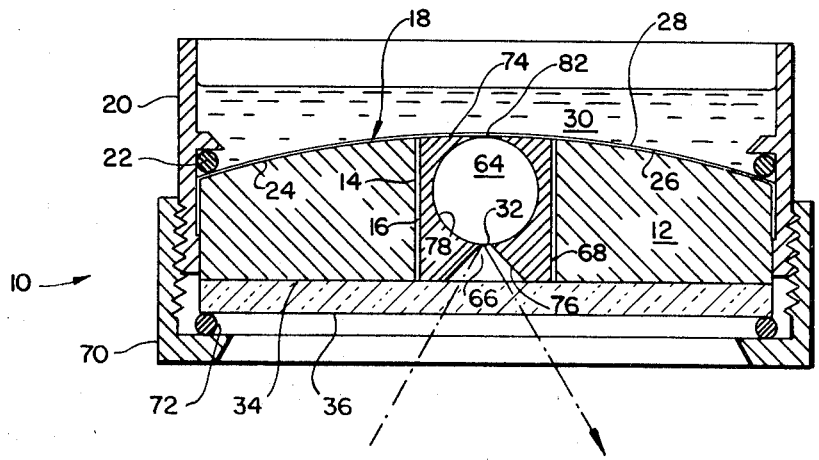
FIG. 2 is a partial front elevational view, in section, of another embodiment of the instant invention.

In the embodiment shown in FIG. 2, a liquid metal such as mercury 64 is used for forming transducer membrane 32. Mercury 64 is in a spherical opening or hollow 78 in a cylinder 68, having an orifice 66, in which transducer membrane 32 is formed, at its lower end and an opening 82 at its upper end. Cylinder 68 fits in inner space 14, so that mercury 64 is surrounded by solvent 16. Thus, mercury 64 is entirely within cell 12. A ring clamp 70 and O-ring gasket 72 hold a transparent window 36 against cell body 12 and supports cylinder 68 and transducer membrane 32. If window 36 and lower face 34 of cell 12 are optically flat, they may seal simply due to the pressure. Alternately, a suitable cement can be used to make the interface between window 36 and lower face 34 leaktight. The upper surface 74 of cylinder 68 is slightly convex to match and continue the curvature of spherical surface 24 of cell 12.

The lower surface of cylinder 68 has a conical aperture 76 communicating with mercury 64 in spherical hollow 78. The orifice 66 between hollow 78 and conical aperture 76 accommodates transducer membrane 32, which may be for example 0.2 mm. in diameter. Its design must meet the requirements discussed in copending application Ser. No. 50,462 filed June 20, 1970. Motion of membrane 32 may be observed and measured by means of an optical lever like that of FIG. 1. The incident and reflected beams pass through window 36 and aperture 76. Orifice 82 at which the mercury 64 is in contact with osmotic membrane 18 is larger than orifice 66, for example 2 mm. in diameter. The edges of orifice 82 are desirably quite sharp and thin so that the surface of mercury 94 nowhere has a radius of curvature smaller than about 1 mm. except at orifice 66 in response to osmotic pressure. Solvent 16 fills all of the space inside cell 12 not occupied by other parts, for example, the thin space between osmotic membrane 18 and cell 12, inner space 14 and conical aperture 76. The solvent in inner space 14 is in communication with the solvent in conical aperture 76. This can be accomplished simply by having the bottom surface of cylinder 68 roughened so that it does not seat tightly on window 36 or by providing grooves in the lower surface of cylinder 68. Solvent 16 must also be present between osmotic membrane 18 and the top of the mercury exposed in orifice 82, so that osmotic flow may take place through this part of the membrane 18, generating an osmotic pressure that will be transmitted to the mercury.

This device is compensated against mechanical and hydraulic pressure because the transducer membrane 32 is completely enclosed within the space occupied by solvent 16 and hence is within the space characterized by the high elastance of the overall osmometer 10. The two sides of the transducer membrane 32 are in hydraulic contact with each other via solvent 16. Any change of hydraulic or atmospheric pressure is rapidly transmitted through osmotic membrane 18 and then acts uniformly throughout the interior of inner space 14 of cell 12, including both sides of transducer membrane 32.

The diameter of orifice 66 governs the elastance of transducer membrane 32. The construction of the rest of osmometer 10, especially window 36, is desirably sufficiently rigid that the overall elastance of cell 12 is not much less than that of transducer membrane 32 itself. Inner space 14 is sufficiently narrow that sagging of osmotic membrane 18 into it will not cause much loss of elastance. The "soft" part of the cell envelope, i.e., the part of osmotic membrane 18 above orifice 82, transmits the osmotic pressure to transducer membrane 32. Here, the stiffness of osmotic membrane 18 must be small compared to that of transducer membrane 32, so that the undesirable elastic properties of osmotic membrane 18, such as nonlinearity, hysteresis, and drift, will not impair the performance of transducer membrane 32.

It may be shown that:

$$E_t/E_o = (1-\sigma^2) \, Tr_o^6 / 2Y_o z_o^3 r_t^4 \quad (i)$$

where $E_t$ is the elastance of transducer membrane 32 and $E_o$ that of the unsupported part of osmotic membrane 18 above mercury 64. $\sigma$ is the Poisson's ratio, $Y_o$ the Young's modulus, and $z_o$ the thickness of the osmotic membrane. $T$ is the surface tension of mercury 64 against solvent 16 and $r_o$ is the radius of orifice 82 and $r_t$ the radius of orifice 66. $Y_o$ is approximately $10^9$ dy/cm.$^2$, and $z_o$ is typically 0.01 cm. Thus, when $r_o$ is at least 0.1 cm., the ratio $E_t/E_o$ is high enough that transducer membrane 32 dominates the elastance.

Figure 3:
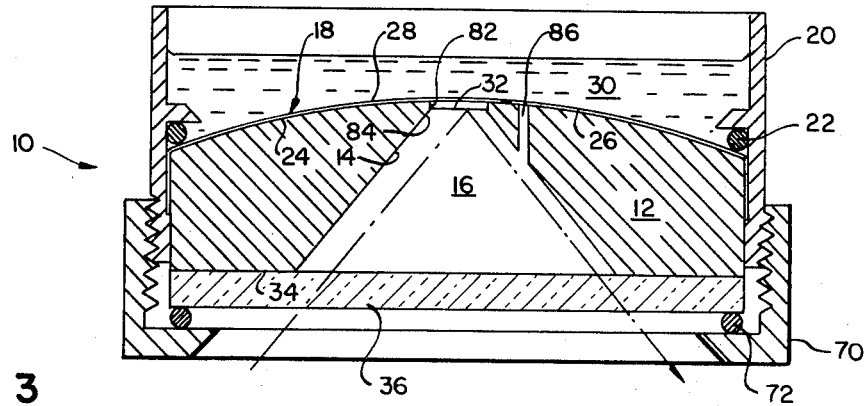
FIG. 3 is a partial front elevational view, in section, of an alternate embodiment of the instant invention.

In the embodiment shown in FIG. 3, a solid transducer membrane 32 is used that will directly support osmotic membrane 18 on one side and is viewed from the other side by the optical lever system.

In FIG 3 the osmotic membrane 18 is clamped to cell 12 by cap 20 and O-ring 22. A strong transparent window 36 is clamped to lower face 34 of cell 12 by ring clamp 70 and O-ring gasket 72. Inner space 14 is in the form of a truncated cone. The narrow end 84 of inner space 14 is adjacent osmotic membrane 18 and is closed by a transducer membrane 32 of a highly elastic solid, e.g., silica. The motion of transducer membrane 32 will be observed by a beam from a light source (not shown in FIG. 3) which passes through window 36 and inner space 14 and is reflected from membrane 32 to the photocells (not shown) of the optical lever system. If desired, transducer membrane 32 may be lightly silvered for better reflectance.

Solvent 16 completely fills inner space 14 and the thin space between inner surface 26 of osmotic membrane 18 and spherical surface 24 of cell 12. A passage 86 provides hydraulic communication between this space and inner space 14 to equalize the pressure on the two sides of transducer membrane 32. The osmometer 10 is desirably rigid and leaktight so that its overall elastance will be essentially that of transducer membrane 32. A film of solvent 16 desirably is present between osmotic membrane 18 and transducer membrane 32 as in the osmometer shown in FIG. 2. Any change of hydrostatic or atmospheric pressure, i.e., any change in mechanical and hydraulic pressure, is equalized across osmotic membrane 18 by virtue of its permeability and across transducer membrane 32 by flow through passage 86. Osmotic pressure of a sample solution 30 causes outward flow of solvent 16 through osmotic membrane 18. Membrane 18 then presses against the entire spherical surface 24 of cell 12, including transducer membrane 32 which thus registers the osmotic pressure.

It will be appreciated that in all cases osmotic membrane 18 readily transmits mechanical and hydraulic pressure which equilibrates with the same speed as osmotic pressure. Consequently, it does not matter whether the two sides of transducer membrane 32 are in hydraulic contact with liquid on the same side of osmotic membrane 18, as in the embodiments of FIGS. 2 and 3, or on opposite sides of it, as in FIG. 1.

Figure 4:
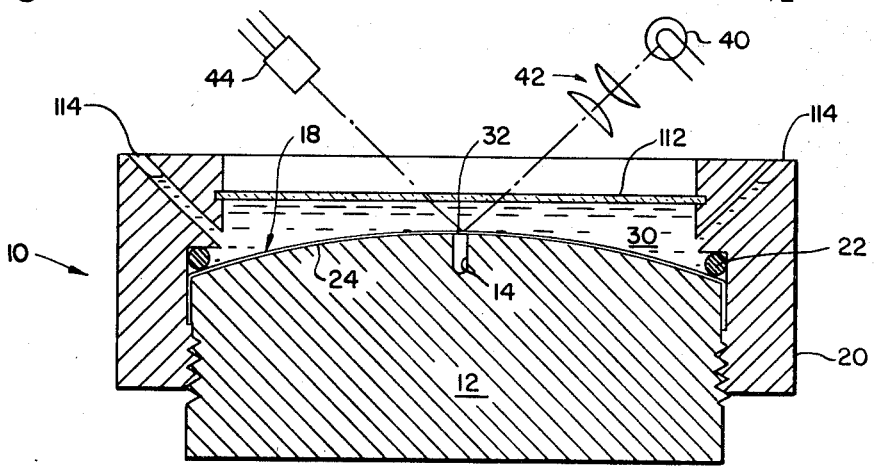
FIG. 4 is a partial front elevational view, in section, of an alternate embodiment of the instant invention.

The embodiment shown in FIG. 4 may be regarded as a simplified variation of that shown in FIG. 3. The separate solid transducer membrane shown in the arrangement of FIG. 3 has been eliminated. The small unsupported area of osmotic membrane 18 that covers inner space 14 now serves as transducer membrane 32. In other words, the transducer membrane is simply a part of the osmotic membrane. In the example shown, inner space 14 is merely a small recess filled with solvent, lying in the upper surface 24 of cell 12. In order to observe and measure the deflection of unsupported membrane area 32, an optical lever can be placed above the cell, in the position shown. A light source 40 is focused by lenses 42 upon membrane area 32, which reflects the beam to photodetector 44. In this case the incident and reflected beams must pass through the sample solution 30 which is placed in contact with osmotic membrane 18. To avoid distortions of the beam due to disturbances of the surface of solution 30, the solution is confined above by a window 112 mounted on cap 20. Channels 114 in cap 20 are provided to permit injecting and removing solution 30 into and from the space confined by membrane 18, cap 20, and window 112. Alternatively, the arrangement of FIG. 3 could be employed, in which conical inner space 14 is confined above by membrane area 32 (which is part of osmotic membrane 18) and below by window 36. The beam of the optical lever would in that case pass through window 36 and inner space 14 rather than through window 112 and solution 30. The embodiment of FIG. 4 functions by virtue of the elasticity of unsupported membrane area 32, which bulges downward in response to the osmotic pressure that arises when the concentration of solution 30 is greater than that of reference solvent 16 in inner space 14. Membrane area 32 does not move in response to changes of mechanical and hydraulic pressure, which it freely transmits. It responds to osmotic pressure only. With a thickness of typically 0.1 mm., an unsupported area of a typical osmotic membrane will exhibit an elastance of 10 to 100 $\mu$b/pl when its diameter is about 1 mm. or a little less, a very convenient value.

Figure 5:
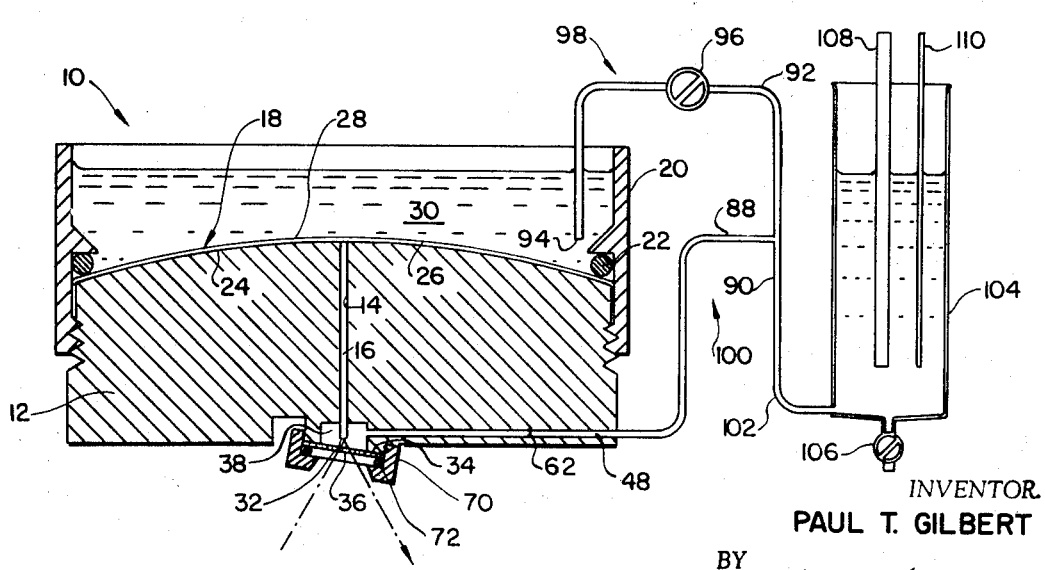
FIG. 5 is a front elevational view, in section, of another embodiment of the instant invention.

The embodiment of the instant invention shown in FIG. 5 can be looked upon as a variation of that shown in FIG. 1. It provides compensation for changes of mechanical and hydraulic pressure in the same way, and it additionally provides means for balancing the osmotic pressure with an externally applied hydraulic pressure that can be measured, thereby converting the osmometer into a null-balance instrument and greatly extending its range of linear measurement without sacrifice of sensitivity. In FIG. 5, as in FIG. 1, transducer membrane 32 desirably is a liquid membrane formed by the terminal meniscus of solvent 16 at the lower end of inner space 14. A variation is shown in that lower face 34 of cell 12 is machined flat but at a slight angle, not parallel to transducer membrane 32. Window 36 is then clamped against lower face 34 by ring clamp 70 and O-ring gasket 72. Being tilted at an angle, window 36 will not reflect light from the light source to the photodetector. If desired, window 36 may be given an antireflection coating to minimize stray light.

Inner space 38 is connected to hollow passage 48 extending through cell 12 with a horizontal portion substantially at the same level as the transducer membrane 32. Passage 48 then extends upwardly and has a second horizontal portion 88 at the same level as osmotic membrane 18. Second horizontal portion 88 desirably has a capillary constriction to inhibit diffusion or convection of liquid when density differences exist between the two ends of horizontal portion 88. Second horizontal portion 88 then forms a T-joint with a vertical portion 90 of passage 48. The upper end 92 of vertical portion 90 bends around and enters solution 30 with its open end 94 extending below the surface thereof. Open end 94 desirably is placed low in solution 30. A valve 96 is provided in upper end 92 of vertical portion 90 of passage 48 so as to separate the passage into two sections, a sample section indicated generally at 98 and a transducer membrane section indicated generally at 100. Valve 96 is desirably so designed that when opened and closed it displaces no liquid in passage 48. The lower end 102 of vertical portion 90 of passage 48 enters the bottom of a vertical cylindrical reservoir 104 which has a drain valve 106 at its bottom. The top of reservoir 104 is desirably at the same level as the top of osmometer 10. One or more cylindrical plungers, 108, 110 are supported vertically in reservoir 104 and may be moved by suitable mechanisms, not shown, that also indicate the height of plungers 108 and 110.

Reservoir 104 and vertical portion 90 of passage 48 are filled with solvent 16. If solvent 16 is water, it may sometimes be desirable to add a suitable surface-active agent to reservoir 104 to insure reproducible wetting of plungers 108 and 110 and smooth motion of meniscus 62. With solution 30 initially consisting of solvent 16, valve 96 and drain 106 are opened to flush air from vertical portion 90, additional solvent being added to maintain the desired level of solution 30. With drain 106 closed and valve 96 open, the liquid level in solution 30 and reservoir 104 will be equal. If desired, clamp 70 may be loosened momentarily to remove air from airspace 38 to bring meniscus 62 into the desired position in the first horizontal portion of passage 48, such that it will not move out of that portion of passage 48 during subsequent manipulations.

When valve 96 is open, the arrangement functions in substantially the same manner as that of FIG. 1 to subject each side of transducer membrane 32 to the same mechanical and hydraulic pressure that prevails at osmotic membrane 18 plus a pressure equal to the head of solvent in inner space 14, so that transducer membrane 32 will respond only to the osmotic pressure. Since second horizontal portion 88 is at the level of osmotic membrane 18, a change of density of the liquid in vertical portion 90 when a sample solution 30 other than solvent is applied to the osmometer will cause no unbalance of the mechanical and hydraulic pressure across transducer membrane 32. Solvent 16 is trapped between the capillary in second horizontal portion 88 and airspace 38. This solvent 16 will exert the same head as the solvent in inner space 14. Hence, the pressure on both sides of transducer membrane 32 equals the head of solution 30 plus the head of solvent 16 in inner space 14 or in passage 48 up to the capillary in second horizontal portion 88.

If solution 30 has an osmotic pressure, solvent 16 will develop a negative pressure equal to the osmotic pressure drawing liquid transducer membrane 32 upward. This negative pressure is then balanced after closing valve 96 by changing the hydrostatic pressure in transducer membrane section 100. This is accomplished by raising one of the plungers 108, 110 in reservoir 104 so as to restore the balance of pressure at transducer membrane 32. Any unbalance is indicated by the optical lever system (not shown). The height reading on the plunger 108 or 110 which has been moved to restore the optical lever system to a balanced position is a measure of the osmotic pressure. If, for example, plunger 108 has 1/11 the cross section of the reservoir, a a vertical motion of 10 cm. will cause the water level to change by 1 cm., corresponding to a pressure of about 1 millibar. Plunger 110 might have 1/10 the cross section of plunger 108 to provide a ten fold greater scale expansion. The choice of plungers depends on the expected osmotic pressure.

While there have been described hereinabove certain embodiments of this invention, it is to be understood that the invention is not limited thereto and various changes, alterations and modifications can be made thereto without departing from the spirit and scope thereof. For example, the pressure transducer membrane 32 in FIGS. 1 and 5 could be a conventional solid membrane and airspace 38 could be filled with liquid. Instead of the system of plungers in a reservoir, a reservoir of adjustable height with a flexible hose connection could be used or a chamber enclosed by a diaphragm moved by a screw and having an attached manometer, or a micrometer syringe with a buffer gas space to serve as a spring could be used. The pressure developed by any such means could be directly indicated by any kind of pressure transducer.

Accordingly, the instant invention is not to be limited to the particular embodiments disclosed, but only by the claims, wherein what is claimed is:

1. In an osmometer of the type having an osmotic membrane rigidly fitted to a cell having an inner space filled with a reference solvent, the outer surface of the membrane being adapted to be in contact with the liquid solution whose osmotic pressure is to be measured and the inner surface of the membrane being in contact with the solvent, and a pressure transducer membrane having two sides and positioned with one side in contact with the solvent so as to respond to the osmotic pressure developed across the osmotic membrane, the improvement which comprises means for transmitting to each side of the transducer membrane any change of mechanical and hydraulic pressure that may occur at the osmotic membrane whereby the transducer membrane responds only to the osmotic pressure.

2. The osmometer of claim 1 including a closed space surrounding the second side of the transducer membrane and containing a gas and wherein the means comprise a hollow passage connecting the gas filled space and the sample solution whereby the mechanical and hydraulic pressure in the solution at the osmotic membrane is transmitted to the second side of the transducer membrane.

3. The osmometer of claim 1 wherein both sides of the transducer membrane lie within the inner space of the osmometer, and the inner space includes a passage through which hydraulic pressure is transmitted from one side of the transducer membrane to the other, and one side of the transducer membrane is subjected to the osmotic pressure to be measured.

4. The osmometer of claim 3 wherein the transducer membrane is a liquid membrane.

5. The osmometer of claim 3 wherein the transducer membrane is a solid membrane.

6. The osmometer of claim 2 including means for controlling the interface between the solution and the gas so that its motion will not result in a change of mechanical and hydraulic pressure.

7. The osmometer of claim 6 wherein the hollow passage has a substantially horizontal portion and the control means are adapted to maintain the interface in the horizontal portion.

8. The osmometer of claim 2 including the following additional components:
 a. a valve in the passage for separating the passage into two sections, a sample section and a transducer membrane section;
 b. means for changing the mechanical and hydraulic pressure in the transducer membrane section when the valve is closed.

9. The osmometer of claim 8 including means for measuring the change in mechanical and hydraulic pressure in the transducer membrane section which balances the osmotic pressure.

10. The osmometer of claim 8 wherein the pressure changing means includes a liquid containing reservoir connected hydraulically to the transducer membrane section and a plunger movable in the liquid in the reservoir to change the mechanical and hydraulic pressure in the transducer membrane section.

11. The osmometer of claim 1 wherein the transducer membrane is a part of the osmotic membrane.

* * * * *